Figure 1:
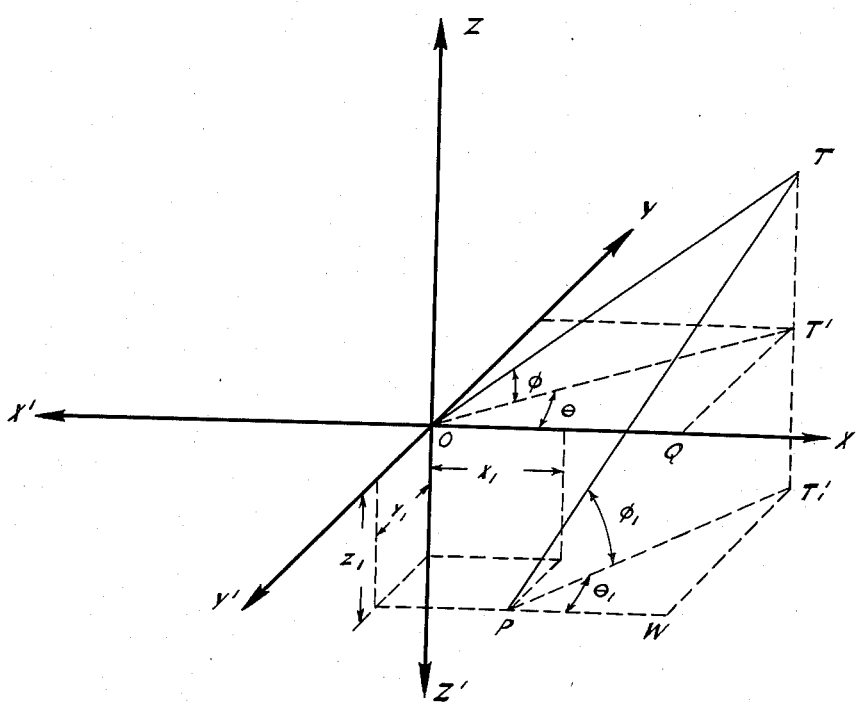

Dec. 20, 1955            D. E. SUNSTEIN            2,728,075
OBJECT POSITION INDICATING SYSTEM INCORPORATING MEANS
FOR AUTOMATICALLY CONTROLLING VIRTUAL REFERENCE POINT
IN RESPONSE TO THE MOVEMENTS OF A PARTICULAR OBJECT

Filed Nov. 16, 1946                          4 Sheets-Sheet 1

INVENTOR.
DAVID E. SUNSTEIN
BY
Brown, Denk & Synnestvedt
AGENTS

INVENTOR.
DAVID E. SUNSTEIN united States Patent Office 2,728,075
Patented Dec. 20, 1955

2,728,075

OBJECT POSITION INDICATING SYSTEM INCORPORATING MEANS FOR AUTOMATICALLY CONTROLLING VIRTUAL REFERENCE POINT IN RESPONSE TO THE MOVEMENTS OF A PARTICULAR OBJECT

David E. Sunstein, Cynwyd, Pa., assignor to Philco Corporation, Philadelphia, Pa., a corporation of Pennsylvania Application November 16, 1946, Serial No. 710,321

5 Claims. (Cl. 343—11)

This invention relates to electrical data converting systems. In particular it relates to systems wherein original data, in the form of electrical signals, indicative of the locations, with reference to a predetermined datum, of objects variously disposed in space are converted or translated to provide modified data, likewise in the form of electrical signals, indicative of the locations of the same objects with reference to a second datum displaced from the first datum. More particularly it relates to a system for use where at least one of the objects is in motion and wherein means are provided for causing the second datum to coincide substantially with, and to move in accordance with the motion of, or to follow, the moving object. The data thus provided may be applied to a suitable indicator to yield a presentation indicative of the positions, with reference to the location of the moving object, of all of the other objects for which data is provided. This presentation will vary both in accordance with the motion of the one object, with which the second datum coincides, and in accordance with the motion of the other objects relative to the second datum.

The invention finds particular application in aircraft location systems of either the pulse-echo or beacon type. In such systems, the data, with reference to a fixed (e. g. ground-based) position, as to the locations of aircraft in flight may be converted into data referred to a virtual viewing point (second datum) which coincides substantially with one of the aircraft. According to the invention this can be effected without the need for any special equipment situated in the aircraft with which the virtual viewing point is to coincide. The converted data thus made available may be presented (e. g. visually) in any well known manner or used for any desired purpose. For example, by application of the methods set forth in my copending application, Serial Number 708,074, filed November 6, 1946, it may be used to provide a stereoscopic presentation of the locations of the aircraft with reference to the virtual viewing point coinciding with one of them. The application of the invention in this connection will be set forth hereinafter.

Basically a system according to the invention comprises: a source of original data (in the form of electrical signals) as to the locations, with reference to a predetermined datum, of objects variously disposed in space, means for converting these data to provide data as to the locations of the same objects with reference to a second datum arbitrarily displaced from said first datum, and means either directly or indirectly responsive to the original data, as to the location of any object within a predetermined range of displacement from the second datum, for automatically causing the second datum to approach coincidence with said object. The system may preferably also include manually operable means for translating the second datum so as to bring it within predetermined range of a selected object, whereupon the system is adapted automatically, in response to data with respect to the location of said object, to cause the second datum constantly to move in a direction tending to establish coincidence with the selected object. The force tending to bring about coincidence is exerted so long as the particular object selected remains within a predetermined range of the second datum, and by limiting this range the system is rendered capable of selecting a particular object with which the second datum will tend to coincide to the exclusion of others outside said range.

In the system, the source of original data above referred to may be a conventional ground-based search radar system employing an orientable antenna. The data converting means may be of known form such, for example, as those described in my aforementioned copending application and in U. S. Patent 2,408,081 of September 24, 1946 to C. A. Lovell et al. for an Artillery Predictor. The construction and mode of operation of other elements of the system and their mode of cooperation in the complete system will be set forth more fully hereinafter.

The objects of my invention may be summarized as follows:

(1) In a system supplied with original data, referred to a predetermined datum, of the locations of objects variously disposed in space, to provide means for converting said data to produce modified data of the locations of said objects referred to a second datum displaced from said first datum, the location of said second datum being controlled in accordance with the location of a selected object which may move;

(2) In a system supplied with data, referred to a predetermined datum, of the locations of objects variously disposed in space, to provide means for converting said data to produce modified data of the locations of said objects referred to one of said objects which is in motion;

(3) In a system supplied with data, referred to a predetermined datum, of the locations of objects variously disposed in space, and including means for converting said data to yield modified data of the locations of said objects referred to a second datum displaced from said first datum, to provide means for automatically causing said second datum to tend toward coincidence with one of said objects which is within a predetermined range of displacement from said second datum; and (4) In a system in accordance with object (3), to provide means for manually translating said second datum so as to bring it within said predetermined range of a selected object, whereupon it will automatically be caused to approach coincidence with said object.

Figure 2:
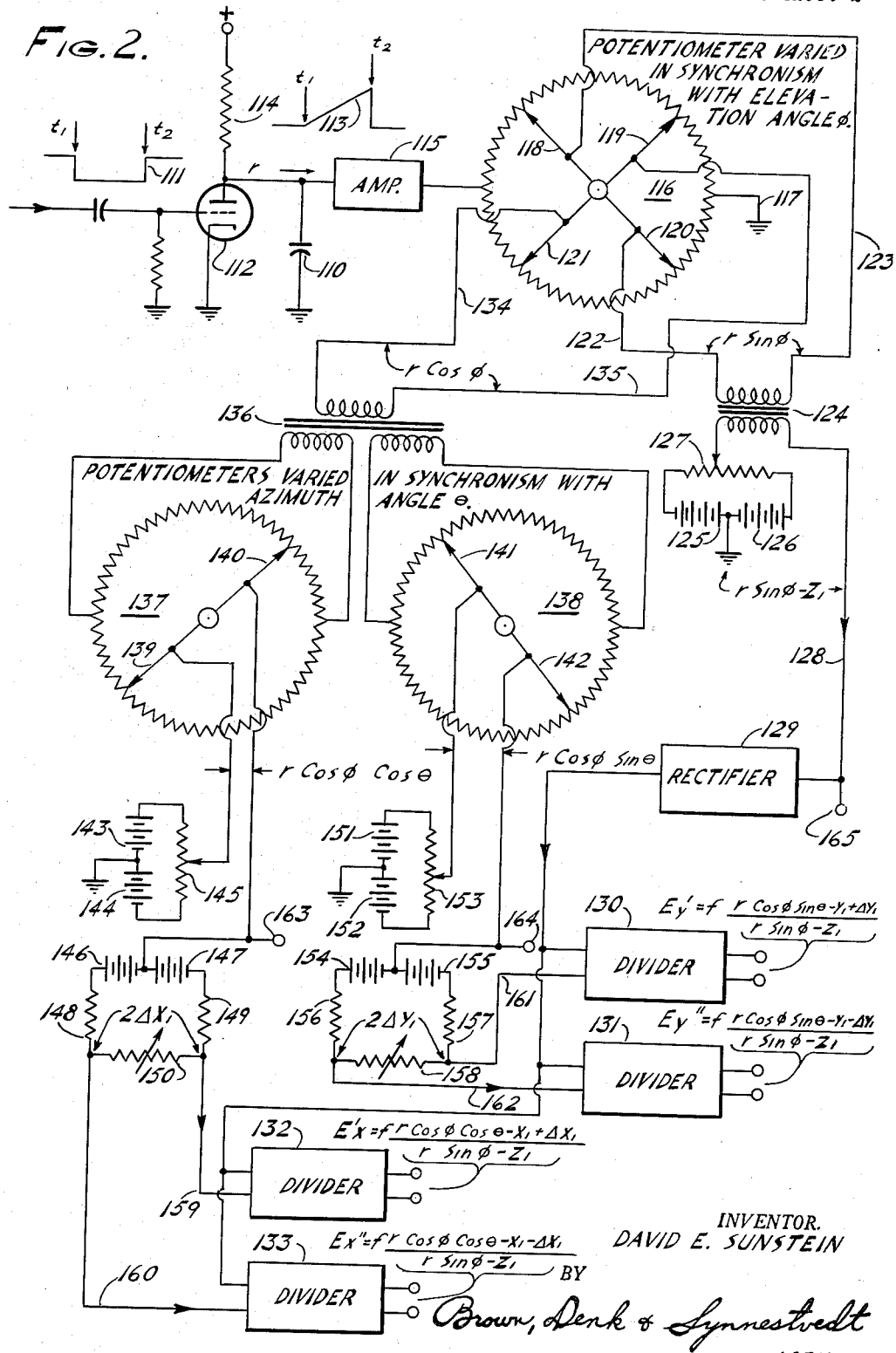
Figure 3:
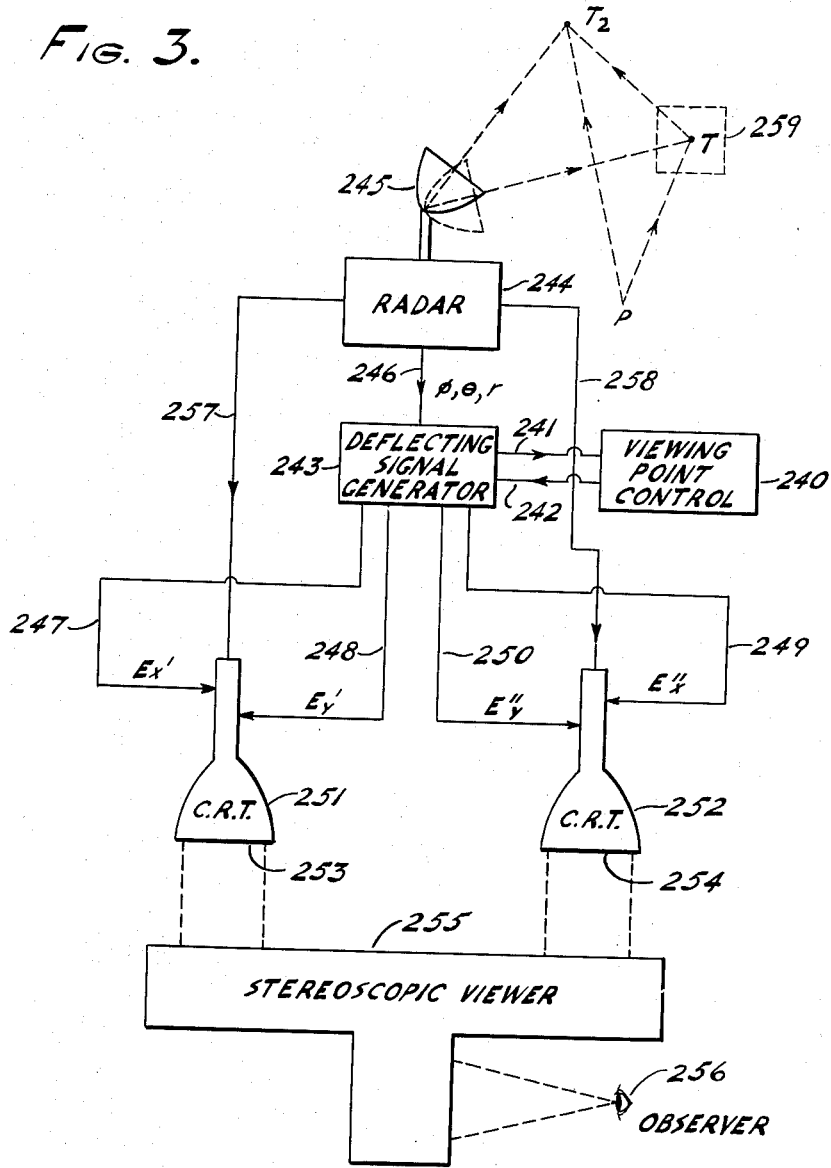
Figure 4:
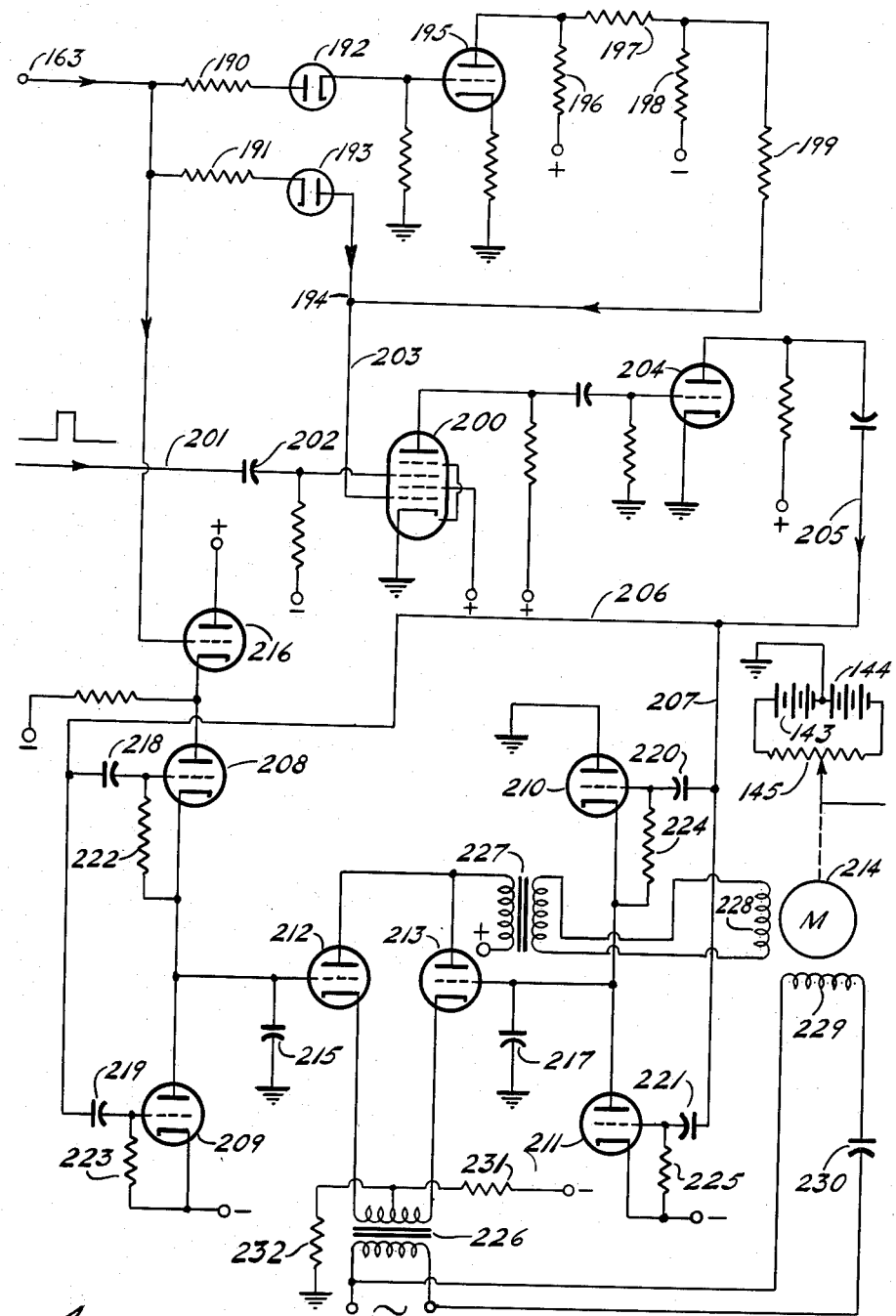

These and other objects of the invention, and the manner in which they are attained, will appear from the following detailed description and the accompanying drawings in which:

Fig. 1 is a diagram in tridimensional orthogonal coordinates, to which reference will be made in explaining the manner in which azimuth, elevation and range data, referred to a predetermined datum point in space, with respect to the positions of objects variously disposed in space, may be converted into bidimensional rectangular coordinate data referred to a predetermined different datum point in space displaced in three orthogonal coordinate directions from said first-named datum point;

Fig. 2 is a schematic diagram of circuits for converting azimuth, elevation and range data, referred to a predetermined datum point in space, into bidimensional rectangular coordinate data, referred to a difference datum point in space, displaced in three orthogonal coordinate directions from said first-named datum point. The circuits illustrated are suitable for use in the deflecting signal generator 243 in the embodiment according to Fig. 3;

Fig. 3 is a block diagram of a complete radar system for providing a stereoscopic presentation indicative of the positions of objects variously disposed in space, referred to a datum point in space which is displaced in three orthogonal coordinate directions from the physical location of the radar apparatus, and the location of which is automatically controlled in accordance with the invention to cause it to tend toward coincidence with the location of a selected point or object in space which may move; and Fig. 4 is a schematic diagram of circuits according to the invention for use in conjunction with the circuits illustrated in Fig. 2, in a system of the sort illustrated in Fig. 3, to effect automatic control of the location of the datum point in space to which the converted data produced by the circuits of Fig. 2 are referred, and for causing said datum point to tend toward coincidence with the location of a selected point or object in space which may move.

Before proceeding with a detailed consideration of the invention, and in order that the same may be more readily and fully understood, it will be desirable first to discuss in some detail a typical system of the sort to which the invention is particularly applicable. When this has been done, I shall proceed to explain the invention itself in detail and the manner in which it cooperates with the system. The system to be described is one for producing a three-dimensional or stereoscopic visual presentation of the positions of a plurality of objects variously disposed in space, and is generally in accordance with the disclosure of my aforementioned copending application.

In a conventional radar system, transmitting time-spaced pulses of high frequency energy and receiving reflections of said pulses from target objects, it is common to use the intelligence contained in the received reflected signals to reconstruct a graphic indication or plot of the targets within range of the transmitter and receiver. For this purpose a cathode ray tube or like indicator is generally used to provide a two-dimensional plot from which certain data with respect to target locations can be read more or less directly. It is known to use plots of several different forms, each of which is adapted to emphasize, and to make conveniently available, certain target coordinate data. Thus, for example, the form of presentation commonly referred to as "A-Scan" provides a plot of reflected signal amplitude versus range. The so-called B and C scans yield, respectively, plots of range and elevation versus azimuth, while the "PPI" scan provides a polar plot of range versus azimuth angle.

However, although each of these forms of presentation is peculiarly suited to certain specific applications, none of them is directly useful in the production of a true and undistorted three-dimensional or stereoscopic presentation corresponding to direct visual observation. Rather it is necessary, according to one method of producing such a presentation, to provide a pair of presentations corresponding respectively to the images which, for example, would be produced by two optical lenses having displaced parallel axes. These presentations may then be superposed optically, through the medium of a conventional stereopticon, to yield the desired stereoscopic presentation. Presentations of the sort required, which for convenience may be termed "camera presentations," can be produced in response to data from a conventional radar system, as will now be set forth.

Referring now to Figure 1, the position in space of an object at point T, with reference to a predetermined datum point O, is conveniently specified in terms of the elevation angle ($\phi$), the azimuth angle ($\theta$) and the range ($r$) of point T from point O. In a radar system, having, for example, a transmitting and receiving antenna located at point O, the angles $\phi$ and $\theta$ are derivable from the orientation of the antenna at the time of receipt of a radar reflection from an object situated at point T. Likewise the range from point O to point T is proportional to the time elapsed between the transmission of a radar pulse and the arrival of its reflection at point O. From the angles $\phi$ and $\theta$, assuming a lens of predetermined focal length ($f$) located at point O with its optical axis parallel to the axis Z—Z', it is possible to specify the coordinates, in the focal plane of the lens, of the optical image of any point in space. These coordinates are independent of $r$ inasmuch as all points in space lying on the same straight line through the center of the lens are imaged at the same point in the focal plane. If in rectangular form, the coordinates correspond respectively to the horizontal and vertical deflecting potentials which may be applied to an electrostatically deflected cathode ray tube to produce a camera presentation of the point in space as would be seen from point O.

Likewise it is possible, from the data $r$, $\phi$ and $\theta$ supplied by the radar at point O, to specify the coordinates of the optical image of point T (or any other point in space) in the focal plane of a lens located at a point P, displaced from point O in X, Y and Z directions, and having its optical axis parallel to the axis Z—Z'. They correspond respectively to the horizontal and vertical deflecting potentials which, when applied to the deflecting plates of an electrostatically-deflectable cathode ray tube, will produce a camera presentation referred to point P. They are given by the expressions:

$$E_x = f \frac{r \cos \phi \cos \theta - X_1}{r \sin \phi - Z_1} \quad (1)$$

and $$E_y = f \frac{r \cos \phi \sin \theta - Y_1}{r \sin \phi - Z_1} \quad (2)$$

Since, for the production of a stereoscopic presentation in the manner hereinbefore set forth, two displaced camera presentations are required, there may be derived, from Equations 1 and 2, the expressions for the deflecting signals $E'_x$, $E''_x$, $E'_y$, and $E''_y$ required to produce camera presentations displaced respectively in opposite directions from point P by the amount $\Delta X_1$ and $\Delta Y_1$. They are found to be:

$$E'_x = f \left[ \frac{r \cos \phi \cos \theta - X_1 + \Delta X_1}{r \sin \phi - Z_1} \right] \quad (3)$$

$$E''_x = f \left[ \frac{r \cos \phi \cos \theta - X_1 - \Delta X_1}{r \sin \phi - Z_1} \right] \quad (4)$$

$$E'_y = f \left[ \frac{r \cos \phi \sin \theta - Y_1 + \Delta Y_1}{r \sin \phi - Z_1} \right] \quad (5)$$

and $$E''_y = f \left[ \frac{r \cos \phi \sin \theta - Y_1 - \Delta Y_1}{r \sin \phi - Z_1} \right] \quad (6)$$

In Figure 2 are shown circuits for generating these deflecting signals in response to data ($r$, $\phi$ and $\theta$) supplied by a conventional radar. A signal which varies proportionally to $r$ during an interval following each radar transmitted pulse is developed across condenser 110. To generate this signal, negative pulses of the form shown at 111, commencing at times $t_1$ corresponding to the transmission of a radar pulse and terminating at times $t_2$ prior to transmission of the next subsequent radar pulse, are supplied to the grid of gas tube 112 to render it non-conducting during the interval $t_1$—$t_2$. The time constant of the RC circuit comprising resistor 114 and condenser 110 may be made such that the portion of the signal 113 developed across condenser 110 between times $t_1$ and $t_2$ is essentially linear and therefore proportional to $r$. This signal is supplied through an isolating amplifier 115 to a tap on circular potentiometer 116. The opposite tap of the potentiometer is grounded through connection 117. The potentiometer is provided with four rectangularly displaced sliders 118, 119, 120 and 121 which are rotated in synchronism with elevation angle $\phi$. The resistive elements comprising potentiometer 116 may be so tapered, in accordance with practices well known in the art, that a signal equal to $r \sin \phi$ is developed between sliders 118 and 120, while a signal equal to $r \cos \phi$ is developed between sliders 119 and 121. The $r \sin \phi$ signal is supplied through connections 122 and 123 to the primary winding of a transformer 124. By means of batteries 125 and 126 and potentiometer 127, whose slider is connected to one terminal of the secondary winding of transformer 124, a potential of controllable magnitude $Z_1$ is subtracted from the signal in the secondary winding of transformer 124 to yield, between the other secondary winding terminal and ground, a signal equal to $r \sin \phi - Z_1$. The latter signal is supplied through connection 128, and optionally through a rectifier 129, to the divisor input terminals of dividers 130, 131, 132 and 133. The function of rectifier 129 will be set forth hereinafter.

The $r \cos \phi$ signal developed between sliders 119 and 121 of potentiometer 116 is supplied through connections 134 and 135 to the primary winding of transformer 136. Transformer 136 is provided with a pair of secondary windings, the terminals of each of which are connected to oppositely disposed taps on potentiometers 137 and 138 respectively. Each potentiometer is provided with a pair of opposed sliders which are rotated in synchronism with azimuth angle $\theta$, and the potentiometers are so constructed and operated as to develop, between sliders 139 and 140, a signal equal to $r \cos \phi \cos \theta$, and, between sliders 141 and 142, a signal equal to $r \cos \phi \sin \theta$. By means of batteries 143 and 144 and potentiometer 145 there is subtracted, from the signal from potentiometer 137, a potential of controllable magnitude $X_1$. Also by means of a network comprising batteries 146 and 147 and resistors 148, 149 and 150, there is added to and subtracted from the resultant signal a further small potential $\Delta X_1$ corresponding to one-half the X displacement between the points to which the respective camera presentations are to be referred. The resultant signals, appearing at opposite ends of resistor 150, are supplied through connections 159 and 160 to the dividend input terminals of dividers 132 and 133. These dividers operate to divide the dividend inputs by the divisor inputs to yield horizontal deflecting signals according to expressions (3) and (4).

In a similar manner, by means of batteries 151 and 152 and potentiometer 153, there is subtracted from the signal from potentiometer 138 a potential of controllable magnitude $Y_1$. Also, by means of a network comprising batteries 154 and 155 and resistors 156, 157 and 158, there is added to and subtracted from the resultant signal a further small potential $\Delta Y_1$ corresponding to one-half the Y displacement between the virtual locations of the respective camera presentations. The resultant signals, appearing at opposite ends of resistor 158, are supplied through connections 161 and 162 to the dividend input terminals of dividers 130 and 131. These dividers operate to divide the dividend inputs by the divisor inputs to yield vertical deflecting signals according to expressions (5) and (6).

The voltage dividers 130, 131, 132 and 133 may take any one of several different forms. Each may, for example, comprise means for first reciprocating the divisor and means for then multiplying the dividend by the reciprocated divisor. Reciprocation may be accomplished by generating a frequency modulated signal whose instantaneous frequency is proportional to the divisor, integrating the modulated signal and rectifying the integrated signal to obtain a signal corresponding to the envelope of the integrated signal, which will be approximately proportional to the reciprocal of the divisor. Another method of achieving reciprocation is to employ a remote cut off tube in which, over a limited range, the plate current is approximately inversely proportional to the grid voltage.

Multiplication of the dividend by the reciprocated divisor may be accomplished, for example, by producing separate carrier signals respectively amplitude modulated by the dividend and by the divisor. These modulated carrier signals are heterodyned, one with the other, and either the sum or difference term produced by heterodyning is selected and rectified to yield a signal which is essentially proportional to the product of the two modulating signals. For optimum results under all circumstances, and particularly when the two signals to be multiplied are not appreciably different in amplitude, it is preferable, in the heterodyning process, to employ a square-law rectifier.

Alternatively the division of the dividend by the divisor signal may be achieved directly. To this end there may be employed a pentagrid tube having a remote cut off grid and a linear control grid, each being shielded from the other and from the tube plate. The dividend signal is applied to the linear grid, while the divisor signal is applied to the remote cut off grid, which is negatively biased. The tube plate current will be substantially proportional to the ratio of the grid voltages.

It will be understood, of course, that, with reference to any of the foregoing methods, a single-sided arrangement may be used if signals of but one polarity are involved, but that a push-pull arrangement should be employed where either one or both of the signals changes polarity.

Rectifier 129, included in the circuit as hereinbefore referred to, operates to eliminate ambiguity in presentation which would otherwise result where, for example, the radar supplying data to the system is situated at ground level and the virtual viewing point P is located above the surface of the ground (e. g. in an aircraft). Under such circumstances, in the absence of rectifier 129, divisor input signals to dividers 130, 131, 132 and 133 would be of positive or negative polarity depending upon whether the objects producing them were above or below the virtual viewing point. Objects, both those above and those below the virtual viewing point, would appear on the presentation and there would be no method of distinguishing them. Rectifier 129 may be so poled that only divisors of a predetermined polarity will be supplied to the dividers, and hence only objects above or those below the virtual viewing point will be presented.

The means just described for producing, in response to radar data, camera presentations related to points remote from the location of the radar do not constitute a part of the present invention but are claimed in my aforementioned copending application.

In the complete stereoscopic radar system shown in Figure 3, a radar transmitter and receiver 244 is provided with an orientable antenna 245 adapted successively to transmit pulses of high frequency energy and to receive reflections of such pulses which impinge on target objects variously disposed in space. Although antenna 245, as shown, may be of the mechanically orientable type, it would be equally feasible to use an antenna comprising fixed elements whose directionality is controllable by varying the phasing of the signals supplied to or received from the several elements. The orientation of the antenna is preferably varied systematically both in azimuth and elevation by appropriate means (not shown) so as to scan a predetermined region in space, wherein are located a plurality of target objects whose positions it is desired to indicate by means of a stereoscopic presentation. Information as to elevation, azimuth and range of these targets, with reference to a predetermined datum coinciding with antenna 245, is supplied from radar 244 through connection 246 to deflecting signal generator 243 which may comprise the circuits hereinbefore discussed with reference to Figure 2. The horizontal and vertical deflecting signals $E'_x$ and $E'_y$ produced by deflecting signal generator 243, are supplied through connections 247 and 248 respectively to the horizontal and vertical deflecting plates of electrostatically-deflectable cathode ray tube 251. Similarly horizontal and vertical deflecting signals $E''_x$ and $E''_y$ from deflecting signal generator 243 are supplied through connections 249 and 250, respectively, to the horizontal and vertical deflecting plates of electrostatically-deflectable cathode ray tube 252. Through connections 257 and 258 from radar 244 to cathode ray tubes 251 and 252 are supplied received, object-reflected pulses to control the intensities of the electron beams in cathode ray tubes 251 and 252 respectively and in identical manner. By virtue of the different reflecting signals applied respectively to cathode ray tubes 251 and 252, there will be produced, on their respective screens 253 and 254, camera presentations referred to appropriately displaced virtual viewing points. These separate presentations may be viewed through a stereoscopic viewer 255 by an observer located at point 256 who will thereby obtain a three-dimensional or stereoscopic impression indicative of the locations of objects in the region scanned by antenna 245. Moreover by appropriate adjustment of potentiometers 127, 145 and 153 in the deflecting signal generator according to Figure 2, it will be possible for him to view the objects as if he were located, for example, at point P in Figure 1 (second datum) displaced from the radar antenna 245 which is assumed to be located at point O in Figure 1 (first datum). Furthermore, in accordance with the present invention and through the medium of viewing point control 240 it will be possible for him to select a predetermined object T, which may correspond to an aircraft moving in space, as his virtual viewing point.

The viewing point control 240, which comprises the present invention and which will now be explained in detail, is supplied through connection 241 with data from deflecting signal generator 243 and, in response to such data, controls the operation of the deflecting signal generator through the medium of connection 242, so as to cause the second datum or virtual viewing point P to move in such a manner that it remains always in substantial coincidence with the selected object T. As will presently be pointed out, it is found convenient to have the viewing point control 240 capable of effecting such coincidence only when the virtual viewing point P has first been brought within a predetermined range of displacement from the selected object T. In the present instance, for example, viewing point control 240 may be adapted to become effective whenever point P is brought within the boundaries of a cube of predetermined dimensions symmetrically disposed with reference to a selected object T, as diagrammatically represented by the broken-line square 259. This insures that the virtual viewing point will tend toward coincidence only with the object closest to it, and the system will not tend to become confused by the presence of other objects in the region scanned by radar antenna 245. Thus, in actual operation, whenever it is desired to cause the virtual viewing point to seek coincidence with a particular object, the virtual viewing point, if not within the predetermined range of the selected object, may be translated, so as to bring it within said range, by manual adjustment of potentiometers 127, 145 and 153 of the deflecting signal generator according to Figure 2.

Referring again to Figure 1, it will be seen that, in order for the virtual viewing point P to coincide with the target point T, the following conditions must be satisfied:

$$X_1 = r \cos \phi \cos \theta \quad (7)$$
$$Y_1 = r \cos \phi \sin \theta \quad (8)$$
$$Z_1 = r \sin \phi \quad (9)$$

When these conditions are satisfied, both numerators and denominators are reduced to zero in the expressions (1) and (2) hereinbefore given for the deflecting signals required to produce a presentation in which the virtual viewing point is displaced with reference to the radar. Thus, by varying $X_1$, $Y_1$ and $Z_1$ so as to keep both numerators and denominators equal to zero in expressions (1) and (2), the virtual viewing point can be made to follow the target T of Figures 1 and 3 as it moves about in space. Signals corresponding to both numerators and the common denominator of expressions (1) and (2) are present in the deflecting signal generator according to the schematic of Figure 2 at terminals 163, 164 and 165. By appropriately setting potentiometers 145, 153 and 127, these signals may be made equal to zero at the times of receipt of successive reflections from a selected target. Means for accomplishing this result in any one of the three cases will now be described with reference to Figure 4.

In Figure 4, terminal 163 may be connected to the correspondingly identified terminal of the circuit of Figure 2, whereby the signal $r \cos \phi \cos \theta - X_1$, which forms the numerator of expression (1), is supplied through isolating resistors 190 and 191 to the plate of diode 192 and the cathode of diode 193 respectively. The plate of diode 193 is connected directly to point 194. The cathode of diode 192, on the other hand, is connected to point 194 through a phase inverter comprising tube 195 and resistors 196, 197, 198 and 199. By these means the potential at point 194 will be made to go negative whenever the numerator signal appearing at point 163 departs from zero in either sense.

Through connection 201, including condenser 202, there are applied, to a control grid of gate tube 200, positive pulses corresponding to received, object-reflected radar pulses (e. g. from radar 244 of Figure 3). By appropriate selection of the potential applied to the screen grid of tube 200, it may be rendered capable of passing these pulses only when the potential at point 194, which is applied through connection 203 to another control grid of tube 200, approximates zero within predetermined limits. Obviously these limits are controllable by varying the screen potential of tube 200. Negative pulses, appearing in the plate circuit of tube 200 whenever these conditions are satisfied, are inverted by tube 204. The resultant positive pulses are applied through connections 205, 206 and 207 to the grids of tubes 208, 209, 210 and 211. The latter, together with tubes 212 and 213 and associated connections, comprise a control circuit adapted to cause motor 214 to rotate by an amount and in a sense commensurate with the extent to which the potential at terminal 163 departs from zero at the time when tube 200 is rendered conductive to pass received radar pulses. Motor 214, in turn, is mechanically linked to potentiometer 145, which is the same as that correspondingly identified in Figure 2 and which determines the value of $X_1$ in the numerator of Equation 1. Thus, if potentiometer 145 is initially adjusted manually to a value of $X_1$ approximating the X coordinate of the target on which the system is to be locked, the circuit shown in Figure 4 is adapted automatically to readjust the setting of potentiometer 145, upon the arrival of each reflection from the target, so as to keep the value of $X_1$ substantially equal to the X coordinate of the target as it moves in space. If desired, motor 214 may have substantial inertia, so that, as the target moves, potentiometer 145 tends to be properly repositioned even while the antenna is scanning targets other than the selected one with which the virtual viewing point is to be made to coincide. Conversely the instantaneous setting of potentiometer 145 will be indicative of the X-displacement of the virtual viewing point from the radar, which displacement may be read directly therefrom.

In the motor control circuit, upon the application of a positive pulse through connection 206 to the grids of tubes 208 and 209, they will be rendered momentarily conductive. Condenser 215 will be charged almost instantaneously to an extent determined by the plate potential of tube 208, which in turn is determined through the medium of cathode follower tube 216 by the potential at terminal 163. Likewise tubes 210 and 211, when they are rendered conductive by the same positive pulse applied to their grids through connection 207, will charge condenser 217 by an amount determined by the connection of the plate of tube 210 to ground, as shown. During the conduction of tubes 209, 210 and 211, condensers 218, 219, 220 and 221 will be charged so that, following the positive pulses applied to the grids of tubes 208, 209, 210 and 211, they will be biased beyond cut-off at least until the occurrence of the corresponding positive pulse produced by the next pulse received from the selected target. To this end the time constants of the RC circuits formed between resistors 222, 223, 224 and 225 and condensers 218, 219, 220 and 221 respectively should be appreciably greater than the scanning repetition period of the radar antenna with which the circuits of Figure 4 are to be used.

The difference between the potentials across condensers 215 and 217, following each conductive period of tubes 208-211, is a measure of the departure of the signal at terminal 163 from zero. This difference potential is applied between the grids of a pair of variable transconductance tubes 212 and 213. The latter have their cathodes supplied through transformer 226 from a source of alternating potential and are appropriately biased by virtue of the connection from a center tap on the secondary winding of transformer 226 to a voltage divider comprising resistors 231 and 232. Depending upon the difference in the potentials of the grids of tubes 212 and 213, the magnitude of the fundamental component of alternating current, in the primary winding of transformer 227 in the plate circuits of tubes 212 and 213, will vary, being zero when the grids of both tubes are at the same potential and their transconductances are the same. The alternating current thus produced in the primary winding of transformer 227 is transmitted through its secondary to a winding 228 of the two phase motor 214. The other winding 229 of the motor may be supplied through a suitable phase shifting condenser 230 from the same alternating potential source which supplies the cathodes of tubes 212 and 213.

The circuit of Figure 4 has been described with specific reference to its use for controlling potentiometer 145 in the circuit according to Figure 2, so as to cause the signal at terminal 163 in the circuit of Figure 2 to have a value of zero at the time of the arrival of a radar reflection from a target to which the viewing point of the stereoscopic radar system is to be locked. However, it will be apparent that duplicates of this circuit may likewise be used to control potentiometers 153 and 127 so as to make the values of the signals appearing at terminals 164 and 165 respectively equal to zero simultaneously with the signal at terminal 163. In fact, when three such control circuits are incorporated in a stereoscopic radar system according to Figure 10, certain of the components (namely tubes 195, 200 and 204) may be made common to all three circuits.

In the system according to Figure 3, the viewing point control 240 may therefore comprise separate means, in accordance with the immediately foregoing description, each adopted to control one of potentiometers 127, 145 and 153 (Figure 2). In a typical instance, then, operation of the system may be as follows: Potentiometers 127, 145 and 153 are adjusted initially so that the virtual viewing point (second datum) of the system is located at point P (Figure 1) displaced from typical objects T and T₂. The stereoscopic presentation produced corresponds, so far as the relative positions of the objects are concerned, to a view which would be obtained by direct and unimpeded visual observation from point P. By manual adjustment of potentiometers 127, 145 and 153, the viewing point P may be caused, in effect, to move toward object T. When it has thus been brought within sufficiently close range of object T (i. e. within cube 259) the automatic viewing point control circuits 240 will become operative to cause point P to approach substantially exact coincidence with object T. Thereafter, though object T may move in space, point P will invariably move so as to tend to re-establish coincidence therewith, provided, of course, that during the interval between the receipt of successive reflections from object T by radar 244, the separation between point P and object T does not exceed the maximum permissible for continued operation of the viewing point control circuits. As already pointed out this maximum may be set at any desired value but preferably should be small enough so that the system will not tend to become confused by the presence of other targets close to the selected one to which it is desired to lock the second datum of the system. With coincidence thus established between the second datum or virtual viewing point P and a selected object T, in response to data supplied from radar 244, the stereoscopic presentation provided by the system will be referred to the location of selected target T and will move in correlation with the motion of the target, subject to the limitations hereinbefore mentioned.

It will, of course, be understood that the invention is susceptible of embodiment in physical forms other than those here shown, and that component circuits other than those described, but adapted to produce equivalent results may be devised by those skilled in the art based on the principles hereinbefore set forth. In particular it may be reiterated that although the invention has been described with reference to its application in a stereoscopic radar system, it is by no means limited to such use. Rather it is applicable wherever it may be desired, in response to data indicative of the locations of a plurality of objects variously disposed in space, to refer said data to a selected one of said objects which may be in motion. Accordingly the scope of the invention is to be regarded as subject only to the limitations embodied by the appended claims.

I claim:

1. In an object position indicating system: object scanning means responsive to energy emanating from objects in space to produce object signals whose times of occurrence are indicative of the ranges of said objects and to produce a coordinate signal whose instantaneous value is indicative of one coordinate, measured with respect to a first coordinate system of predetermined position, of points successively scanned by said object-scanning means; means for producing a reference signal and for modifying said coordinate signal in response thereto, thereby to produce a modified coordinate signal indicative of a co-ordinate value of said successively-scanned points measured with respect to a second coordinate system displaced from said first coordinate system, the magnitude of said reference signal being controllable to vary said displacement of said second coordinate system; a controllably-transmissive signal transfer device responsive to said object signals and to said modified coordinate signal to produce output signals upon the application thereto of said object signals and upon the attainment by said modified coordinate signal of values which differ from zero in either sense by less than a predetermined amount; means responsive to said modified coordinate signal and to said output signals to produce a control signal whose polarity is indicative of the polarity of said modified coordinate signal upon the occurrence of said output signals; and means responsive to said control signal to modify said reference signal in a sense to cause said control signal to approach a value of zero.

2. The system of claim 1, comprising, in addition, manually operable means for controlling said reference signal to cause said modified coordinate signal to differ from zero by less than said predetermined amount upon the occurrence of said output signals.

3. In an object position indicating system: object scanning means responsive to energy emanating from objects in space to produce object signals whose times of occurrence are indicative of the ranges of said objects and to produce a coordinate signal whose instantaneous value is indicative of one coordinate, measured with respect to a first coordinate system of predetermined position, of points successively scanned by said object-scanning means; means for producing a reference signal and for modifying said coordinate signal in response thereto, thereby to produce a modified coordinate signal indicative of a coordinate value of said successively-scanned points measured with respect to a second coordinate system displaced from said first coordinate system, the magnitude of said reference signal being controllable to vary said displacement of said second coordinate system; and means for causing said modified coordinate signal to approach zero upon the production of object signals emanating from an object disposed within a predetermined range of the origin of said second coordinate system; said last-named means comprising a controllably-transmissive signal transfer device responsive to said object signals and to said modified coordinate signal to produce output signals upon the application thereto of said object signals and upon the attainment by said modified coordinate signal of values which differ from zero in either sense by less than a predetermined amount; means responsive to said modified coordinate signal and to said output signals to produce a control signal whose polarity is indicative of the polarity of said modified coordinate signal upon the occurrence of said object signals emanating from said object located within a predetermined range of said origin of said second coordinate system; and means responsive to said control signal to modify said reference signal in a sense to cause said control signal to approach zero.

4. In an object position indicating system: object scanning means responsive to energy emanating from objects in space to produce object signals whose times of occurrence are indicative of the ranges of said objects and for producing an original coordinate signal whose instantaneous value is indicative of one coordinate, measured with respect to a first tridimensional orthogonal coordinate system of predetermined position in space, of points successively scanned by said object-scanning means; a controllable source of reference potential; an electronic subtractor supplied with said original coordinate signal and said reference potential, for producing a modified coordinate signal substantially equal to the difference between said original coordinate signal and said reference potential, said modified coordinate signal being indicative of said coordinate value of said successively scanned points in space measured with respect to a second coordinate system displaced along said coordinate direction by an amount and in a sense indicated by the value and polarity of said reference potential; a controllably-transmissive signal transfer device supplied with said object signals and responsive thereto to produce output signals when said device is rendered transmissive; means responsive to said modified coordinate signal to produce an error signal which varies in a single direction upon departures of said modified coordinate signal from zero in either sense; means for supplying said error signal to said signal transfer device to increase substantially the transmissivity of said signal transfer device upon the attainment by said error signals of values less than a predetermined magnitude; means responsive to said modified coordinate signal and to said output signals of said signal transfer device to produce other signals indicative of the magnitude and polarity of said modified coordinate signal upon the occurrence of said output signals and hence upon the application to said signal transfer device of object signals from an object lying within a predetermined range of the origin of said second system of coordinates; and control means including a motor and responsive to said other signals to control said controllable source of reference potential to vary said reference potential in a direction to reduce said other signals, thereby to reduce said difference between said original coordinate signals and said reference potential upon the occurrence of object signals from said object.

5. A system in accordance with claim 4, comprising, in addition, manually operable control means for controlling said reference potential to vary the value of said original coordinate signal for which said modified coordinate signal approaches zero.

References Cited in the file of this patent

UNITED STATES PATENTS

| | | |
|---|---|---|
| 2,408,050 | De Rosa | Sept. 24, 1946 |
| 2,409,462 | Zworykin et al. | Oct. 15, 1946 |
| 2,419,567 | Labin | Apr. 29, 1947 |
| 2,426,189 | Espenschied | Aug. 26, 1947 |
| 2,426,979 | Ayres | Sept. 9, 1947 |
| 2,428,351 | Ayres | Oct. 7, 1947 |
| 2,467,208 | Hahn | Apr. 12, 1949 |